3,085,939
OIL-IN-WATER EMULSION FOR ORAL ADMINISTRATION, AND PROCESS FOR PREPARATION
Milton Wruble, Kalamazoo Township, Kalamazoo County, Sven J. Rundman, Kalamazoo, and John H. Koning, Portage Township, Kalamazoo County, Mich., assignors to The Upjohn Company, Kalamazoo, Mich., a corporation of Delaware
No Drawing. Filed May 11, 1959, Ser. No. 812,094
6 Claims. (Cl. 167—65)

This invention relates to a pharmaceutical preparation and to a process for the compounding thereof. More specifically, it relates to a palatable, stable, fluid pharmaceutical preparation for oral use in the treatment of elevated blood levels of cholesterol and to a process for compounding the said palatable, stable pharmaceutical preparation for oral use.

A satisfactory fluid pharmaceutical preparation comprising an edible unsaturated oil and sitosterol was unavailable prior to the present invention. Although the reasons for this unavailability are unknown, it is apparent that the related problems of palatability and stability had not been solved because the requisite formula and process for compounding had not been discovered.

When the aforesaid problems were encountered, many experimental formulae and compounding processes were attempted without success. A solution of the sitosterol in the unsaturated oil was found to be unsatisfactory and unacceptable with reference to palatability as was a water-in-unsaturated oil emulsion containing the sitosterol. A preparation comprising a sitosterol unsaturated-oil solution emulsified in water did not possess the requisite stability and was objectionable as to taste. Only the present preparation and process satisfied all the related requirements of ease of manufacture, stability of the preparation, proportions of the therapeutically-active ingredients and supplementary ingredients, ideal dosage form, palatability, pharmaceutical elegance and the like.

The present invention comprises a palatable, stable, fluid pharmaceutical preparation containing an edible unsaturated oil and sitosterol. The preparation has readily acceptable palatability, is admirably suited for repeated oral administration and is stable during compounding and storage thereafter. Unexcepted therapeutic effects are obtained by oral administration of the preparation. The process for compounding by novel procedures the said pharmaceutical preparation improves the stability and preserves other characteristics that are required in a completely acceptable pharmaceutical preparation.

Generally described, the process for compounding the present preparation comprises incorporating a sitosterol aqueous dispersion by novel means in an edible unsaturated oil-in-water emulsion whereby a stable, palatable, fluid preparation is successfully accomplished.

In contradistinction to other preparations containing an edible unsaturated oil and sitosterol, it was found that the present preparation possesses unexpected stability and palatability. It was found that averting contact in the final product between the sitosterol and the oil provides a superior product. Averting said contact is accomplished by preparing separately an emulsion of the oil and an aqueous dispersion of the sitosterol, preferably utilizing protective colloidal materials and emulsifiers, for example, methylcellulose, sodium carboxymethylcellulose, sodium alginate, polyethylene glycol disteartes, triethanolamine stearate, cetyl alcohol and stearyl alcohol. It is especially preferred to use methylcellulose as the protective colloidal material in the sitosterol aqueous dispersion and the distearate of polyethylene glycol 400 as the emulsifier in the oil-in-water emulsion. When so prepared, the sitosterol aqueous dispersion and the edible unsaturated oil-in-water emulsion can be mixed without impairing the stability of either component or causing unpalatability.

As used in the specification and claims of the present application, the term edible unsaturated oil has reference to those edible oils containing unsaturated fatty acids. The unsaturated fatty acids include, for example, oleic acid (1 double bond), linoleic acid (2 double bonds), linolenic acid (3 double bonds), moroctic acid (4 double bonds) and the like. The edible unsaturated oils include, for example, olive, palm, cottonseed, peanut, soybean, sesame, corn, sunflower seed, linseed, rapeseed, sardine, menhaden, tung, safflower, poppyseed, rice bran, almond, wheat germ oils, and the like. Oily dispersions of the unsaturated fatty acids can be used. In the present preparation it is preferred to use the edible unsaturated oils having substantial percentages of linoleic acid, for example, soybean oil, safflower oil, corn oil, sunflower seed oil, and mixtures thereof.

As used in the specification and claims of the present application, the term sitosterol has reference to the mixed sterols, mainly β-sitosterol and accompanying 3-hydroxysterols, obtainable from plant sources such as cottonseed, soybean, tall oil, sugar cane, coffee beans and the like. In the present preparation it is preferred to use the sitosterols from soybean. An especially satisfactory sitosterol is the sitosterol hydrate disclosed in copending application Serial No. 702,786.

The principal therapetically-active ingredients of the present preparation are the edible unsaturated oil and the sitosterol. The amount of the oil can vary from about 1 to about 35 percent by volume of the preparation, with from about 22 to about 33 percent preferred. The amount of the sitosterol can vary from about 1 to about 17 percent weight/volume, with from about 10 to about 15 percent preferred.

Complementary therapeutically-active ingredients can be included in the present preparation. Said ingredients include, for example, vitamin A, pyridoxine hydrochloride, nicotinic acid, cyanocobalamin, phenylbutyric acid, ethinyl estradiol, thyroxine and oil-free soybean lecithin.

The supplementary ingredients comprise surfactants, preservatives, flavors, sweeteners, suspending agents, protective colloidal materials, emulsifiers, and the like. A particularly advantageous supplementary ingredient is an antioxidant, for example, dl-alpha-tocopheryl acetate and tertiary butyl-4-hydroxyanisole.

The present preparation is useful for oral administration in lowering the cholesterol content of the blood. It can be administered in teaspoonful or tablespoonful dosages several times daily. The preferred amount is from one to two tablespoonfuls three times a day to provide from about 3 to about 30 milliliters of the unsaturated vegetable oil and from about 1.5 to about 14 gms. of the sitosterol. Infants and children usually require reduced dosages based on age and weight.

The following experimental formulae and processes for compounding a fluid pharmaceutical preparation comprising an edible unsaturated oil and sitosterol illustrate the unexpected compounding and stability problems which are solved by the preparation and process of the present invention.

EXPERIMENTAL FORMULA A

Each 15 mls. contains:

| | |
|---|---|
| Triethanolamine | percent__ 0.6 |
| Stearic acid | do____ 1.5 |
| Polysorbate 80 U.S.P. | do____ 0.1 |
| Safflower oil | do____ 65 |
| Sitosterol | gms__ 2 |
| Purified water U.S.P., q.s. | |

*Part I.*—Heat a portion of the water and the triethanolamine to 70 to 80° C. Make up to volume with the balance of the water.

*Part II.*—Heat the safflower oil, stearic acid and polysorbate 80 to 70 to 80° C. Dissolve the sitosterol therein.

*Part III.*—Add Part I to Part II with constant stirring.

*Result.*—Produces a poorly emulsified ointment-like final preparation with an inferior taste.

EXPERIMENTAL FORMULA B

Each 15 mls. contains:

| | |
|---|---|
| Corn oil_____percent__ | 70 |
| Cyclamate sodium_____do____ | 0.3 |
| Sitosterol _____gms__ | 2 |
| Polyethylene glycol 400 distearate_____percent__ | 0.5 |
| Polysorbate 80 U.S.P_____do____ | 0.1 |
| Sorbitan monooleate_____do____ | 0.05 |
| Preservative _____do____ | 0.15 |
| Flavor _____do____ | 0.4 |
| Purified water U.S.P., q.s. | |

*Part I.*—In a portion of the water heated to 80 to 85° C. dissolve the cyclamate sodium and polysorbate 80.

*Part II.*—Dissolve the preservative in the corn oil (80 to 85° C.). Add the sorbitan monooleate and polyethylene glycol 400 distearate. Stir until homogeneous. Dissolve the sitosterol.

*Part III.*—Add Part I gradually to Part II with active agitation. When the temperature has dropped to 40 to 45° C., add the flavor and adjust the volume with water. Stir until homogeneous.

*Result.*—The final preparation contains an oily, external phase and is unacceptable to the taste.

The following examples set forth the best mode contemplated by the inventors of carrying out their invention but are not to be construed as limiting.

EXAMPLE 1

*Part I—50 Gallons—Sitosterol Aqueous Dispersion*

| | Gals. | Lbs. | Oz. | Grains |
|---|---|---|---|---|
| Sodium lauryl sulfate_____ | | | 6 | 296 |
| Sitosterol, milled_____ | | 111 | | |
| Methylcellulose_____ | | 4 | 3 | |
| Preservative_____ | | | 11 | 154 |
| Purified water, U.S.P., q.s. ad_____ | 50 | | | |

Dissolve the sodium lauryl sulfate in 35 gallons of the water. Add the sitosterol with medium agitation. Add the methylcellulose while stirring. Add the preservative and make up to volume with water.

*Part II—50 Gallons—Corn Oil Emulsion*

| | Gals. | Pts. | Lbs. | Oz. | Grains |
|---|---|---|---|---|---|
| Preservative_____ | | | | 10 | 7 |
| Polyethylene glycol 200 distearate__ | | | 5 | 3 | 198 |
| Corn oil_____ | 36 | 4 | | | |
| Sweetener_____ | | | | 1 | 4 |
| Purified water, U.S.P., q.s. ad_____ | 50 | | | | |

(A) Dissolve the preservative in the corn oil at room temperature. Melt the polyethylene glycol 200 distearate and add to the corn oil solution.

(B) Dissolve the sweetener in 10 gals. of the water. Add A to B slowly with active agitation, make up to volume and pass through an homogenizer.

*Final product.*—Pass Part II through an homogenizer into Part I. Stir for about 20 minutes to mix well. The 100-gallon final preparation is greatly superior to the experimental formulae in fluidity and palatability. It can be administered in dosages of one tablespoonful three times daily to combat cholesterolemia.

EXAMPLE 2

*Part I—6 Gallons—Sitosterol Aqueous Dispersion*

| | Gals. | Pts. | Lbs. | Oz. | Grains |
|---|---|---|---|---|---|
| Preservative_____ | | | | 1 | 159 |
| Polyoxyethylene sorbitan trioleate__ | | | | | 175 |
| Sodium lauryl sulfate_____ | | | | | 351 |
| Sorbitan trioleate_____ | | | | | 53 |
| Sorbitol solution N.F._____ | | 3 | | 9 | |
| Sitosterol, milled_____ | | | 13 | 6 | |
| Sodium alginate, micronized_____ | | | | 8 | 10 |
| Purified water, U.S.P., q.s. ad_____ | 6 | | | | |

Dissolve the polyoxyethylene sorbitan trioleate and the sodium lauryl sulfate in 3 gals. of the water. Add the sitosterol with slow agitation. Add the sorbitan trioleate. Add the preservative. Add a slurry of the sodium alginate in the sorbitol solution. Stir well. Process through a colloid mill.

*Part II—6 Gallons—Corn Oil Emulsion*

| | Gals. | Lbs. | Oz. | Grains |
|---|---|---|---|---|
| Corn oil_____ | | 33 | 8 | |
| Sodium lauryl sulfate_____ | | | | 351 |
| Triethanolamine U.S.P._____ | | | 2 | |
| Stearic acid_____ | | | 4 | |
| Preservative_____ | | | 1 | 88 |
| Cyclamate sodium_____ | | | 2 | 176 |
| Essential oil flavor_____ | | | 3 | |
| Purified water, U.S.P., q.s. ad_____ | 6 | | | |

(A) In a portion of the water heated to 80° C. dissolve the sodium lauryl sulfate and cyclamate sodium. Add the triethanolamine.

(B) Dissolve the preservative in the corn oil at 80° C. Add the stearic acid and stir until homogeneous. Add A to B with active agitation. At 40° C. add the flavor, adjust to volume with water and pass through an homogenizer.

*Final product.*—Add Part II to Part I with medium agitation.

*Result.*—12 gallons of palatable, stable preparation are obtained. The final product did not break during high speed stirring. Each 15 mls. (approximately one tablespoonful) contains 36 percent v./v. of corn oil and 14 percent w./v. of sitosterol. The preparation is administered orally in dosages of one tablespoonful three times daily to reduce the cholesterol content of the blood.

EXAMPLE 3

*Part I—50 Gallons—Sitosterol Aqueous Dispersion*

| | Gals. | Pts. | Lbs. | Oz. | Grains |
|---|---|---|---|---|---|
| Polyoxyethylene sorbitan trioleate____ | | | | 3 | 148 |
| Sodium lauryl sulfate_____ | | | | 6 | 296 |
| Preservative_____ | | | | 11 | 154 |
| Methylcellulose, 15 cps. } micronized | | | 4 | 2 | |
| d-Sorbitol crystalline } mixture | | | 28 | 3 | |
| Sitosterol hydrate | | | 111 | | |
| Purified water, U.S.P., q.s. ad_____ | 50 | | | | |

Dissolve the polyoxyethylene sorbitan trioleate and sodium lauryl sulfate in 35 gallons purified water. Add the micronized sitosterol-methylcellulose-sorbitol mixture slowly. Add the preservative and stir slowly overnight to remove air. Add purified water U.S.P., q.s. ad 50 gals.

*Part II—50 Gallons—Corn Oil Emulsion*

| | Gals. | Pts. | Lbs. | Oz. | Grains |
|---|---|---|---|---|---|
| Preservative_____ | | | | 10 | 7 |
| Polyethylene glycol 400 distearate__ | | | 5 | 3 | 198 |
| Sorbitan nonooleate_____ | | | | 6 | 296 |
| Corn oil_____ | 36 | 4 | | | |
| Cyclamate sodium_____ | | | | 1 | |
| Polysorbate 80, U.S.P._____ | | | | 4 | |
| Essential oil flavor_____ | | 1 | | 3 | 148 |
| Purified water, U.S.P., q.s. ad_____ | 50 | | | 9 | 288 |

(A) Dissolve the sorbitan monooleate and preservative in the corn oil at room temperature. Melt the polyethylene glycol 400 distearate and add to the corn oil solution.

(B) Dissolve the cyclamate sodium polysorbate 80 in 10 gallons purified water.

Add A to B slowly with active agitation. Add the flavor and add water, q.s. ad 50 gallons. Process through an homogenizer.

*Final product.*—Pass Part I through an homogenizer into Part II. Stir for approximately 15 minutes to mix well.

*Result.*—The 100-gallon final preparation is superior to the experimental formulae in fluidity and palatability; however, it is somewhat thick for easy filling into pint containers. It can be administered orally in dosages of one tablespoonful four times daily to combat cholesterolemia.

EXAMPLE 4

*Part I—Sitosterol Aqueous Dispersion*

|  | Gals. | Pts. | Lbs. | Oz. | Grains |
| --- | --- | --- | --- | --- | --- |
| Sitosterol | | | 117 | | |
| Methylcellulose, 15 cps | | | 4 | 6 | |
| d-Sorbitol crystalline | | | 30 | | |

The sitosterol is milled, mixed with the methylcellulose and sorbitol and the whole is air micronized.

|  | Gals. | Pts. | Lbs. | Oz. | Grains |
| --- | --- | --- | --- | --- | --- |
| Polyoxyethylene sorbitan trioleate | | | | 3 | 148 |
| Sodium lauryl sulfate | | | | 13 | 154 |
| Preservative | | | | 11 | 154 |
| Purified water, U.S.P., q.s. ad | 50 | | | | |

Dissolve the polyoxyethylene sorbitan trioleate and one half the sodium lauryl sulfate in 35 gallons purified water. Add the micronized sitosterol-methylcellulose-d-sorbitol mixture slowly. Add the preservative and stir slowly to remove air. Let stand overnight. Add the remainder of the sodium lauryl sulfate. Add purified water, q.s. ad 50 gallons.

*Part II—Corn Oil Emulsion*

|  | Gals. | Pts. | Lbs. | Oz. | Grains |
| --- | --- | --- | --- | --- | --- |
| Corn oil | 33 | 3 | | | |
| Polyethylene glycol 400 distearate | | | 20 | 14 | |
| Sorbitan monooleate | | | | 3 | 148 |
| Preservative | | | | 10 | |
| Cyclamate sodium | | | 1 | 4 | |
| Polysorbate 80, U.S.P | | | 2 | 1 | 167 |
| Essential oil flavor | | 1 | | 9 | 288 |
| Purified water, U.S.P., q.s. ad | 50 | | | | |

(A) Warm a portion of the corn oil to 130° F. Melt the polyethylene glycol 400 distearate and add. Add this to the remainder of the corn oil brought to room temperature. Add the sorbitan monooleate and preservative.

(B) Dissolve the cyclamate sodium and polysorbate 80 in 10 gallons purified water.

Add A to B slowly with active agitation. Add the flavor. Add purified water q.s., ad 50 gallons and mix well.

*Final product.*—Process Part I through an homogenizer. Pass Part II through the homogenizer into Part I. Stir thoroughly for approximately 30 minutes to provide adequate mixing.

*Result.*—100 gallons of a palatable, stable, fluid preparation is obtained. Each 15 mls. (approximately one tablespoonful) contains 33 percent v./v. of corn oil and 14 percent w./v. of sitosterol.

The preparation is administered orally in dosages of one tablespoonful three times daily to reduce the cholesterol content of the blood.

EXAMPLE 5

Following the process of Example 4, 100 gals., each 15 mls. (approximately one tablespoonful) containing 22 percent v./v. of safflower oil and 10 percent w./v. of sitosterol, is prepared by substituting 83 lbs. 9 ozs. of sitosterol for the 117 lbs. in Part I and 22 gals. of safflower oil for the corn oil in Part II.

The preparation is palatable and stable and can be administered orally in dosages of two tablespoonfuls three times daily to reduce the cholesterol content of the blood.

EXAMPLE 6

An especially desirable preparation, each 15 mls. (approximately one tablespoonful) containing 0.4 mg. of vitamin $B_6$, is prepared by incorporating 171 grains of the vitamin into the water portion of B in Part II of Example 4 without affecting the palatability of the preparation.

EXAMPLE 7

100 gals. is prepared in accordance with the formula and process of Example 4. Additionally 1 oz. 419 grains of dl-alpha-tocopheryl acetate and 234 grains of tertiary butyl-4-hydroxyanisole are incorporated in the corn oil of A in Part II to provide antioxidant effects without affecting the palatability of the preparation.

EXAMPLE 8

Following the process of Example 4, 100 gals., each 15 mls. containing 22 percent v./v. of soybean oil and 10 percent w./v. of sitosterol, is prepared by substituting 83 lbs. 9 oz. of sitosterol for the 117 lbs. in Part I and 22 gals. of soybean oil for the corn oil in Part II.

The preparation is platable and stable and can be administered orally in dosages of two tablespoonfuls three times daily to reduce the cholesterol content of the blood.

EXAMPLE 9

Following the process of Example 4, 100 gals., each 15 mls. containing 22 percent v./v. of sunflower seed oil and 10 percent w./v. of sitosterol, is prepared by substituting 83 lbs. 9 oz. of sitosterol for the 117 lbs. in Part I and 22 gals. of sunflower seed oil for the corn oil in Part II.

The preparation is palatable and stable and can be administered orally in dosages of two tablespoonfuls three times daily to reduce the cholesterol content of the blood.

It is to be understood that the invention is not to be limited to the exact details of operation or exact compositions shown and described, as obvious modifications and equivalents will be apparent to one skilled in the art, and the invention is therefore to be limited only by the scope of the appended claims.

What is claimed is:

1. A palatable, stable, fluid oil-in-water emulsion for oral administration comprising:

(*a*) an aqueous dispersion medium containing a protective colloid;

(*b*) an internal phase containing by volume of the emulsion from about 1 to about 35% of an edible unsaturated oil; and (*c*) an additional internal phase containing by weight/volume of the emulsion from about 1 to 17% of sitosterol;

said protective colloid averting contact between the oil and the sitosterol to provide improved stability and palatability.

2. The emulsion of claim 1 wherein the sitosterol is present in the form of sitosterol hydrate.

3. The emulsion of claim 1 which contains in addition pyridoxine hydrochloride and an edible anti-oxidant.

4. A palatable, stable, fluid oil-in-water emulsion for oral administration comprising:

(*a*) an aqueous dispersion medium containing a protective colloid;

(b) an internal phase containing by volume of the emulsion from about 22 to about 33% of an edible unsaturated oil; and (c) an additional internal phase containing by weight/volume of the emulsion from about 10 to about 15% of sitosterol;

said protective colloid averting contact between the oil and the sitosterol to provide improved stability and palatability.

5. A palatable, stable, fluid oil-in-water emulsion for oral administration comprising:

(a) an aqueous dispersion medium containing a protective colloid;

(b) an internal phase containing by volume of the emulsion from about 1 to about 35% of an edible unsaturated oil; and (c) an additional internal phase containing by weight/volume of the emulsion from about 1 to 17% of sitosterol;

said protective colloid averting contact between the oil and the sitosterol to provide improved stability and palatability, the oil and sitosterol being present in concentrations such that a dosage unit of the emulsion provides between about 0.6 and about 9 mgs. of the sitosterol and between about 0.6 and about 21 mls. of the oil.

6. The process for preparing a palatable, stable, fluid oil-in-water emulsion for oral administration containing an edible unsaturated oil and sitosterol and in which contact between the oil and the sitosterol is averted to provide improved stability and palatability comprising:

(1) forming a sitosterol aqueous dispersion in the presence of a protective colloid material, (2) forming an edible unsaturated oil-in-water emulsion, and, (3) uniformly mixing said dispersion and said emulsion without causing contact between the oil and the sitosterol.

References Cited in the file of this patent

FOREIGN PATENTS

| 721,514 | Great Britain | Jan. 5, 1955 |
| 513,648 | Canada | June 14, 1955 |
| 785,387 | Great Britain | Oct. 30, 1957 |
| 555,637 | Canada | Apr. 8, 1958 |

OTHER REFERENCES

Peterson: P.S.E.B.M., 78:1, October 1951, pp. 143–147.

Federation Procs., 17:1, March 1958, Part 1, p. 485, No. 1902.

Modern Drug, July 1956, pp. 808–899.

Beher; P.S.E.B.M., 90:1, October 1955, pp. 223–225.

Meltzer: American J. of Med. Sci., 236:5, p. 601.

Armstrong: P.S.E.B.M., 96:2, November 1957, pp. 302–305.

Transactions N.Y. Acd. of Sci., 18:2 Ser. II, December 1955, pp. 111–122.

Fahquhar: Circulation, vol. XIV, July 1956, pp. 77–82.

Parsons: Proc. Mayo Clinic, vol. 31, No. 13, pp. 377–390, June 1956.

Becker: Am. Professional Pharmacist, vol. 20, No. 10, pp. 939–944.